(12) United States Patent
Poon (10) Patent No.: US 9,554,671 B2
(45) Date of Patent: Jan. 31, 2017

(54) GRILLING APPARATUS

(71) Applicant: Innovative International, LLC, Lutz, FL (US)

(72) Inventor: Enoch Poon, Lutz, FL (US)

(73) Assignee: Innovative International, LLC, Lutz, FL (US)

( * ) Notice: Subject to any disclaimer, the term of this patent is extended or adjusted under 35 U.S.C. 154(b) by 0 days.

(21) Appl. No.: 14/722,132

(22) Filed: May 26, 2015

(65) Prior Publication Data

US 2015/0265097 A1  Sep. 24, 2015

Related U.S. Application Data

(63) Continuation-in-part of application No. 14/047,455, filed on Oct. 7, 2013.

(51) Int. Cl.
*A47J 31/06* (2006.01)
*A47J 37/06* (2006.01)

(52) U.S. Cl.
CPC ......... *A47J 37/0694* (2013.01); *Y10T 29/4962* (2015.01)

(58) Field of Classification Search
CPC ...... A47J 37/06; A47J 37/067; A47J 37/0763; A47J 37/0682; A47J 37/0694; A47J 37/0713; A47J 37/0786; F24C 15/10; Y10T 29/4962
USPC ................................. 99/425, 445; 29/897.15
See application file for complete search history.

(56) References Cited

U.S. PATENT DOCUMENTS

| | | | | |
|---|---|---|---|---|
| 709,048 | A * | 9/1902 | Sausser et al. | A47J 37/067 99/450 |
| 1,178,298 | A * | 4/1916 | Carlton | A47J 37/0704 99/447 |
| 1,221,228 | A * | 4/1917 | Shaffner | A47J 37/0892 99/343 |
| 1,373,788 | A * | 4/1921 | Ball | A47J 37/067 126/214 C |
| 1,471,039 | A * | 10/1923 | Lee | A47J 37/067 99/445 |
| 1,517,161 | A * | 11/1924 | Kershaw | A47J 37/067 99/445 |
| 1,642,071 | A * | 9/1927 | Hosking | A47J 37/10 99/446 |
| 1,650,634 | A * | 11/1927 | Lutzler | A47J 37/10 126/41 R |

(Continued)

*Primary Examiner* — Eric Stapleton
(74) *Attorney, Agent, or Firm* — Lambrecht Patent Law, LLC; Mark Lambrecht (57) ABSTRACT

A grilling apparatus having a grate and a collection basin. The grate is configured to support food items during a cooking operation and includes a first, second, third, and fourth support member. The collection basin is configured to support the grate during the cooking operation and includes a domed bottom surface having an apex substantially centered in the collection basin, and a first, second, third, and fourth diversion channel along the domed bottom surface, where each diversion channel is configured to channel substances that fall from the grate. The collection basin also includes a first, second, and third basin void passing through the domed bottom surface, where the first basin void is positioned between the first and the second diversion channel, the second basin void is positioned between the second and the third diversion channel, and the third basin void is positioned between the third and the fourth diversion channel.

3 Claims, 7 Drawing Sheets

(56) References Cited

U.S. PATENT DOCUMENTS

| | | | | |
|---|---|---|---|---|
| 1,723,413 A * | 8/1929 | Drehmann | F24B 1/003 | 126/275 R |
| 1,882,159 A * | 10/1932 | Nagle | F24B 5/02 | 126/67 |
| 1,998,920 A * | 4/1935 | Bremer | A47J 39/00 | 99/339 |
| 2,042,773 A * | 6/1936 | Feldman | A47J 37/067 | 99/425 |
| 2,227,608 A * | 1/1941 | Tinnerman | A47J 37/06 | 126/25 A |
| 2,232,203 A * | 2/1941 | Bemis | A47J 37/067 | 126/41 R |
| 2,244,045 A * | 6/1941 | Bobo | F24C 15/24 | 126/116 R |
| 2,420,112 A * | 5/1947 | Utzler | B21D 47/005 | 29/897.15 |
| 2,478,614 A * | 8/1949 | Wilbur | A47J 37/067 | 126/215 |
| 2,565,726 A * | 8/1951 | Garrison | F24C 15/10 | 126/215 |
| 2,604,033 A * | 7/1952 | Chadwick | F24C 15/16 | 99/340 |
| 2,622,186 A * | 12/1952 | Hutchens | A47J 27/04 | 126/20 |
| 2,763,200 A * | 9/1956 | Kittler | A47J 37/0704 | 126/275 E |
| 2,849,949 A * | 9/1958 | Trachtman | A47J 36/022 | 126/214 R |
| 2,940,381 A * | 6/1960 | Cottongim | A47J 37/067 | 126/163 R |
| 3,051,159 A * | 8/1962 | Hardy | A47J 33/00 | 126/25 A |
| 3,177,864 A * | 4/1965 | Bowman | A47J 37/0763 | 126/25 R |
| 3,183,823 A * | 5/1965 | Grimshaw | A47J 37/067 | 99/425 |
| 3,292,528 A * | 12/1966 | Myler | A47J 37/108 | 99/446 |
| 3,308,747 A * | 3/1967 | Spagnolo | A47J 37/067 | 99/400 |
| 3,392,664 A * | 7/1968 | Rosa | A47J 37/0682 | 99/399 |
| 3,407,723 A * | 10/1968 | Varkala | A47J 37/0611 | 99/349 |
| 3,422,746 A * | 1/1969 | Sheinker | A47J 37/06 | 99/400 |
| 3,566,589 A * | 3/1971 | Howell et al. | A01D 43/04 | 56/14.1 |
| 3,583,309 A * | 6/1971 | Freidenrich | A47J 37/0704 | 126/25 A |
| 3,630,189 A * | 12/1971 | Hodges | A47J 37/0682 | 126/41 R |
| 3,646,928 A * | 3/1972 | Grafton | A47J 37/0682 | 126/25 R |
| 3,664,256 A * | 5/1972 | Peirce | A47J 37/0676 | 99/425 |
| 3,913,557 A * | 10/1975 | Ewanika | F24C 5/20 | 126/25 A |
| 3,915,144 A * | 10/1975 | Tomita | F24B 3/00 | 126/25 B |
| 3,915,145 A * | 10/1975 | Tomita | F24B 3/00 | 126/25 A |
| 3,938,494 A * | 2/1976 | Clark | A47J 37/0713 | 126/25 R |
| 3,946,651 A * | 3/1976 | Garcia | A47J 37/067 | 99/444 |
| 4,002,113 A * | 1/1977 | McLane | A47J 37/06 | 99/447 |
| 4,037,580 A * | 7/1977 | Angelo | F24B 1/202 | 126/25 R |
| 4,046,132 A * | 9/1977 | White | A47J 37/0763 | 126/2 |
| 4,307,659 A * | 12/1981 | Martin | A47J 37/06 | 99/444 |
| 4,342,259 A * | 8/1982 | Lee | A47J 37/0713 | 126/41 R |
| 4,351,313 A * | 9/1982 | Kern | A47J 37/0713 | 126/39 J |
| 4,353,347 A * | 10/1982 | Seed | A47J 36/26 | 126/25 R |
| 4,355,570 A * | 10/1982 | Martin | A47J 37/06 | 219/393 |
| 4,403,541 A * | 9/1983 | Berger | A47J 37/067 | 29/433 |
| 4,432,334 A * | 2/1984 | Holt | A47J 37/0694 | 126/25 R |
| 4,454,805 A * | 6/1984 | Matthews | A47J 37/0682 | 99/400 |
| 4,493,308 A * | 1/1985 | Hurley | A47J 37/067 | 122/17.2 |
| 4,508,024 A * | 4/1985 | Perkins | A47J 37/0713 | 126/27 |
| 4,526,158 A * | 7/1985 | Lee | A47J 37/0763 | 126/25 A |
| 4,553,523 A * | 11/1985 | Stohrer, Jr. | A47J 37/0694 | 126/152 B |
| 4,598,634 A * | 7/1986 | Van Horn, II | A47J 37/067 | 99/340 |
| 4,621,608 A * | 11/1986 | Lee | A47J 37/0763 | 126/25 A |
| 4,729,297 A * | 3/1988 | Iranzadi | A47J 37/01 | 99/339 |
| 4,773,386 A * | 9/1988 | Archer | F24B 5/021 | 110/300 |
| 4,827,903 A * | 5/1989 | Kim | F24C 15/2042 | 126/299 D |
| 4,829,975 A * | 5/1989 | Hait | F24B 1/202 | 126/152 B |
| 4,867,050 A * | 9/1989 | Patenaude | A47J 37/0754 | 126/15 A |
| 4,878,476 A * | 11/1989 | Oliphant | A47J 37/0763 | 126/25 R |
| 4,895,131 A * | 1/1990 | Overholser | A47J 37/0713 | 126/25 R |
| 4,896,650 A * | 1/1990 | Hait | F24B 1/202 | 126/152 B |
| 4,909,137 A * | 3/1990 | Brugnoli | A47J 37/0682 | 126/41 R |
| 4,922,887 A * | 5/1990 | Foxford | F24C 3/14 | 126/29 |
| 4,930,488 A * | 6/1990 | Pearman | F24C 3/12 | 126/39 BA |
| 4,930,491 A * | 6/1990 | Purello | A47J 37/0704 | 126/25 R |
| 4,944,284 A * | 7/1990 | O'Quin | F24C 1/16 | 126/39 R |
| 5,024,208 A * | 6/1991 | Hottenroth | F24B 1/202 | 126/25 R |
| 5,078,122 A * | 1/1992 | Kalenian | A47J 37/06 | 126/299 C |
| 5,105,725 A * | 4/1992 | Haglund | A47J 37/0704 | 126/25 R |
| D325,845 S * | 5/1992 | Helman | F24C 1/16 | D7/346 |
| 5,189,945 A * | 3/1993 | Hennick | A47J 37/0786 | 126/25 R |
| 5,211,105 A * | 5/1993 | Liu | A47J 37/067 | 126/348 |
| 5,226,407 A * | 7/1993 | Kalenian | A47J 37/0713 | 110/212 |
| 5,237,914 A * | 8/1993 | Carstensen | A47J 37/0786 | 99/400 |
| 5,259,299 A * | 11/1993 | Ferraro | A47J 37/0713 | 99/340 |
| 5,333,596 A * | 8/1994 | Clifford | A47J 37/0713 | 126/39 BA |
| 5,353,880 A * | 10/1994 | Green | A47J 37/0786 | 126/41 R |

(56) References Cited

U.S. PATENT DOCUMENTS

| | | | | |
|---|---|---|---|---|
| 5,355,868 A * | 10/1994 | Haen | A47J 37/0786 | 126/153 |
| 5,363,752 A * | 11/1994 | Weil | A47J 37/067 | 99/400 |
| 5,368,808 A * | 11/1994 | Koike | B41M 1/40 | 101/35 |
| 5,404,864 A * | 4/1995 | Kent, Jr. | A47J 37/0763 | 126/25 B |
| D364,777 S * | 12/1995 | Schlosser | F24C 1/16 | D7/402 |
| 5,471,916 A * | 12/1995 | Bird | A47J 37/0786 | 126/25 R |
| 5,490,452 A * | 2/1996 | Schlosser | A47J 37/0694 | 99/340 |
| 5,536,518 A * | 7/1996 | Rummel | A47J 37/074 | 126/25 R |
| 5,553,601 A * | 9/1996 | Parker | A47J 37/0763 | 126/38 |
| 5,575,195 A * | 11/1996 | Foxford | A47J 37/0763 | 126/25 R |
| 5,605,143 A * | 2/1997 | Hebert | A21B 3/16 | 126/41 R |
| 5,617,840 A * | 4/1997 | Clifford | A47J 37/0713 | 126/39 BA |
| 5,638,808 A * | 6/1997 | Home | A47J 37/0713 | 126/25 R |
| 5,735,260 A * | 4/1998 | Rimback | A47J 37/0713 | 126/39 J |
| 5,782,166 A * | 7/1998 | Lin | A47J 37/0786 | 126/25 R |
| 5,782,230 A * | 7/1998 | Linnebur | A47J 37/0713 | 126/38 |
| 5,785,046 A * | 7/1998 | Colla | F24B 1/202 | 126/151 |
| 5,813,394 A * | 9/1998 | Clifford | A47J 37/0713 | 126/39 BA |
| 5,839,361 A * | 11/1998 | Richter | A47J 37/0694 | 126/25 R |
| D402,503 S * | 12/1998 | Sanchez | F24C 1/16 | D7/388 |
| 5,873,300 A * | 2/1999 | Kuhlman | A47J 36/2477 | 126/390.1 |
| 5,911,812 A * | 6/1999 | Stanek | A47J 37/067 | 126/25 R |
| 5,964,145 A * | 10/1999 | Brown | A47J 37/1261 | 126/39 J |
| 5,967,135 A * | 10/1999 | Shariat | A47J 37/0754 | 126/21 A |
| 5,979,431 A * | 11/1999 | Hamilton | A47J 37/0682 | 126/304 A |
| 6,000,389 A * | 12/1999 | Alpert | A47J 37/0713 | 126/25 R |
| 6,050,257 A * | 4/2000 | Bond | A47J 37/0763 | 126/25 R |
| 6,065,467 A * | 5/2000 | Martin | A47J 37/0713 | 126/100 |
| 6,114,666 A * | 9/2000 | Best | A47J 37/0713 | 126/39 BA |
| 6,116,230 A * | 9/2000 | Clifford | A47J 37/0713 | 126/39 BA |
| 6,133,554 A * | 10/2000 | Clifford | A47J 37/0713 | 126/39 BA |
| 6,189,527 B1 * | 2/2001 | Walsh | A47J 37/067 | 126/25 R |
| 6,189,530 B1 * | 2/2001 | Shingler | A47J 37/0713 | 126/40 |
| 6,213,006 B1 * | 4/2001 | Reardon | A47J 37/0704 | 126/25 R |
| 6,252,204 B1 * | 6/2001 | Po-Hei | A47J 37/0676 | 219/450.1 |
| D446,683 S * | 8/2001 | Pai | F24C 1/16 | D7/402 |
| 6,286,708 B1 * | 9/2001 | Scheibmeir | A21B 3/13 | 220/573.1 |
| D448,604 S * | 10/2001 | Cho | F24C 1/16 | D7/337 |
| 6,314,868 B1 * | 11/2001 | Christensen | A47J 37/0713 | 126/25 R |
| 6,314,955 B1 * | 11/2001 | Boetcker | A47J 36/2477 | 126/25 R |
| 6,520,174 B1 * | 2/2003 | Scigliuolo | A47J 37/0786 | 126/25 R |
| 6,622,616 B1 * | 9/2003 | Measom | A47J 27/04 | 99/345 |
| 6,701,829 B2 * | 3/2004 | Farrow | A47J 37/0786 | 126/595 |
| 6,708,604 B1 * | 3/2004 | Deichler, Jr. | A47J 37/0763 | 126/25 R |
| 6,782,801 B1 * | 8/2004 | Correa | A47J 37/067 | 99/340 |
| 6,880,493 B2 * | 4/2005 | Clifford | F24H 9/2035 | 122/14.1 |
| 7,073,429 B2 * | 7/2006 | Bruno | A47J 37/0682 | 126/41 R |
| 8,544,382 B2 * | 10/2013 | Zhao | A47J 37/0694 | 126/152 B |
| D695,059 S * | 12/2013 | Mehler | F24C 1/16 | D7/354 |
| 8,720,324 B2 * | 5/2014 | Coutts | A47J 37/0682 | 99/400 |
| 2001/0018914 A1 * | 9/2001 | Shingler | A47J 37/0713 | 126/41 R |
| 2002/0009685 A1 * | 1/2002 | Adiga | A21B 3/04 | 431/247 |
| 2002/0100371 A1 * | 8/2002 | Snoke | A23L 1/0121 | 99/419 |
| 2003/0024525 A1 * | 2/2003 | Jennings | F23D 14/045 | 126/39 R |
| 2003/0213484 A1 * | 11/2003 | Alden | A47J 37/0713 | 126/41 R |
| 2003/0234014 A1 * | 12/2003 | Fitzgerald | A47J 33/00 | 126/25 R |
| 2004/0194774 A1 * | 10/2004 | Nugent | A47J 37/0713 | 126/41 R |
| 2004/0216621 A1 * | 11/2004 | Schlosser | A47J 37/067 | 99/450 |
| 2005/0000368 A1 * | 1/2005 | Siegel | A47J 37/129 | 99/400 |
| 2005/0172948 A1 * | 8/2005 | Rowe | A47J 37/067 | 126/20 |
| 2005/0204931 A1 * | 9/2005 | Cheng | A47J 37/108 | 99/422 |
| 2006/0081236 A1 * | 4/2006 | Johnston | A47J 37/0786 | 126/25 R |
| 2006/0144384 A1 * | 7/2006 | Santagata | A47J 27/62 | 126/25 A |
| 2006/0201497 A1 * | 9/2006 | Lee | F24C 15/10 | 126/211 |
| 2006/0213497 A1 * | 9/2006 | Orozco | A47J 37/0786 | 126/41 R |
| 2006/0283438 A1 * | 12/2006 | Lu | A47J 37/0786 | 126/30 |
| 2007/0125358 A1 * | 6/2007 | Tripp, II | A47J 37/0704 | 126/50 |
| 2009/0025574 A1 * | 1/2009 | Byrnes | A47J 37/0704 | 99/447 |
| 2009/0078245 A1 * | 3/2009 | Chang | A47J 37/0713 | 126/25 B |
| 2009/0183729 A1 * | 7/2009 | Barkhouse | A47J 27/62 | 126/39 BA |
| 2009/0196970 A1 * | 8/2009 | Barrett | A47J 37/067 | 426/523 |
| 2009/0199841 A1 * | 8/2009 | Tsung | A47J 37/0786 | 126/25 R |
| 2009/0205513 A1 * | 8/2009 | Sacherman | A47J 27/002 | 99/426 |
| 2010/0206291 A1 * | 8/2010 | Axinte | A47J 36/025 | 126/25 R |

(56) References Cited

U.S. PATENT DOCUMENTS

| | | | |
|---|---|---|---|
| 2010/0212515 A1* | 8/2010 | Coutts | A47J 37/0682 99/445 |
| 2010/0218754 A1* | 9/2010 | Kuntz | A47J 37/0786 126/25 R |
| 2011/0088679 A1* | 4/2011 | Lerner | A47J 31/58 126/42 |
| 2011/0094493 A1* | 4/2011 | Malumyan | A47J 37/0704 126/25 R |
| 2011/0094494 A1* | 4/2011 | Malumyan | A47J 37/0704 126/25 R |
| 2011/0252977 A1* | 10/2011 | Sacherman | A47J 27/002 99/401 |
| 2012/0111205 A1* | 5/2012 | Coutts | A47J 37/067 99/341 |
| 2012/0160108 A1* | 6/2012 | Coutts | A47J 37/0682 99/341 |
| 2012/0204852 A1* | 8/2012 | Boucher | F24C 1/16 126/30 |
| 2012/0216686 A1* | 8/2012 | Panea | A47J 37/0713 99/450 |
| 2012/0234308 A1* | 9/2012 | Faulk | A47J 37/079 126/25 R |
| 2013/0108750 A1* | 5/2013 | Vitagliano | A23L 1/31 426/312 |
| 2014/0208961 A1* | 7/2014 | Poon | A47J 37/0763 99/445 |
| 2014/0208962 A1* | 7/2014 | Poon | A47J 37/0763 99/445 |
| 2015/0265097 A1* | 9/2015 | Poon | A47J 37/0694 99/425 |

* cited by examiner

GRILLING APPARATUS

CROSS-REFERENCE TO RELATED APPLICATIONS

This application is a continuation-in-part of, and claims priority to, co-pending U.S. application Ser. No. 14/047,455 filed on Oct. 7, 2013, which is a continuation-in-part of co-pending U.S. application Ser. No. 13/752,820 filed on Jan. 29, 2013.

FIELD OF TECHNOLOGY

An improved grilling system is disclosed. Although the improvements are applicable to indoor grilling, the improvements are also applicable to outdoor grilling.

BACKGROUND

It has become increasingly desirable to improve the overall system, design, and operation of indoor grills that can be utilized on cooktops, in ovens, or with other heat sources. Grilling can generate grease and other debris. When grilling indoors, such debris can fall to the heat source (e.g., a cooktop or oven) employed for grilling. Similarly, when grilling outdoors, such debris can fall to the kettle or basin that houses or provides the heat source. Cleaning these kettles, basins, or heat sources can be difficult or at least a nuisance. Further, when debris such as grease comes in contact with a heat source, flare-ups can make grilling problematic.

Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

The present disclosure relates to grilling apparatus that is configured to allow foods to be cooked over an open flame or other heat source while minimizing flare-ups and smoke. The grilling apparatus may be used indoors or outdoors. The apparatus employs a grill/grate and an underlying collection plate or basin that cooperate in a manner that contains cooking fluids or other debris and suppresses and/or minimizes flames.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

DETAILED DESCRIPTION

Figure 1A:
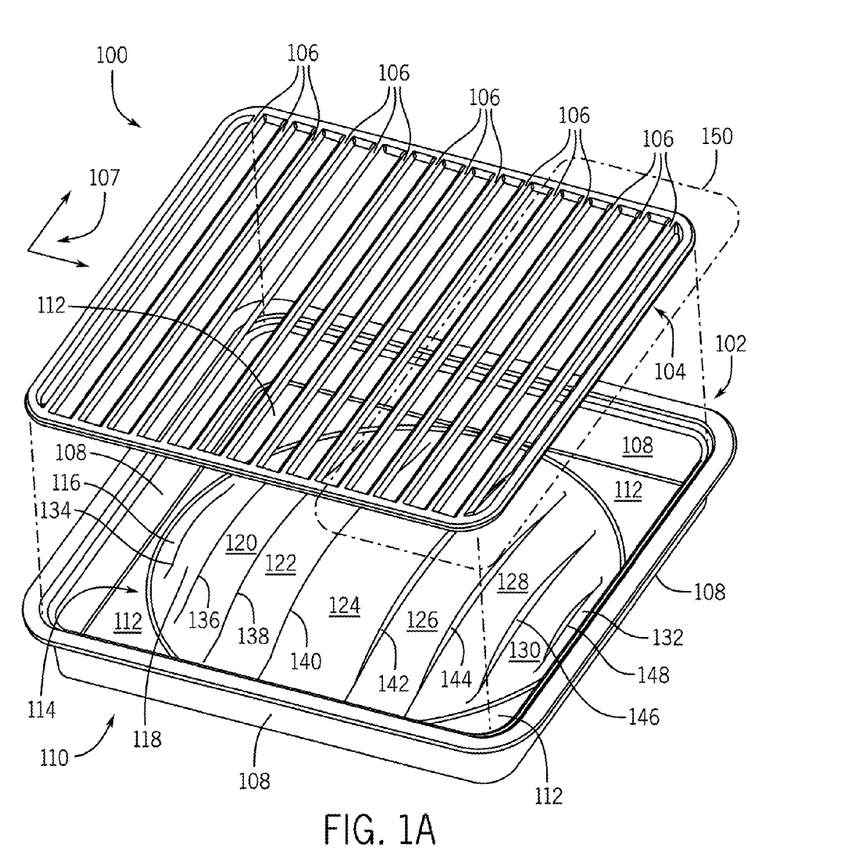
FIG. 1A illustrates an exploded view of an exemplary grilling apparatus according to an embodiment.

FIG. 1 illustrates an exploded view of an exemplary cooking or grilling apparatus 100. The grilling apparatus 100 includes a collection basin or plate 102 and a grate 104 that includes a plurality of support members 106 along a horizontal plane 107 of the grate and configured to support food items (not shown). It is contemplated that the grate may include other support structures than those shown.

The collection plate 102 is configured to support the grate 104. According to an embodiment, the grilling apparatus 100 may be positioned on or in a heat source (not shown). For example, though not shown, the grilling apparatus 100 may be positioned within an oven, an indoor or outdoor grill, over or on a stove burner, or another type of heat source that employs either direct and/or indirect heating.

With continued reference to FIG. 1, the collection plate 102 includes a plurality of sidewalls 108 that terminate at a bottom surface 110 of the collection plate 102. It is noted that though the grilling apparatus 100 with the collection plate 102 and grate 104 is illustrated in FIG. 1 as having a parallelogram shape, other geometries are envisioned such as circular, elliptical, or other forms.

The collection plate 102 includes a trough or reservoir 112 and at least a portion 114 of the bottom surface 110 is arcuate or dome-shaped and includes a plurality of diversion regions or routes 116, 118, 120, 122, 124, 126, 128, 130, 132 that generally follow the contour of the domed portion 114 of the collection plate 102. As such, the diversion routes 116-132 can be considered contours of the domed-shaped portion 114 of the bottom surface. Though nine diversion routes 116-132 are illustrated, it is contemplated that alternate embodiments may employ more or less diversion routes than those shown.

Between adjacent diversion routes 116-132 illustrated in FIG. 1 are voids or slots 134, 136, 138, 140, 142, 144, 146, 148, which form openings through the bottom surface 110 of the collection plate 102. The slots 134-148 follow contours of the domed portion 114 and allow for the free flow of heat therethrough. Further, if a flame-type of heat source is employed, the slots 134-148 may allow flames to pass therethrough towards any food items (not shown) that may be supported by grate 104.

It is noted that the grilling apparatus 100 is configured to ensure that at least some of the support members 106 of the grate 104 align with the slots 134-148 of the collection plate 102 when the collection plate 102 is supporting the grate 104 during use. As such, when in use, fluids or other items that fall past the plurality of support members 106 are more likely to land on one or more of the diversion routes 116-132 rather than pass through the slots 134-148 and land on the heat source employed. Further, due to the domed portion 114 of the bottom surface 110, liquid or other debris that falls onto the diversion routes 116-132 is generally caused to flow to the reservoir 112 for easy clean-up. Accordingly, the heat source (not shown) is protected from grease or other materials. As with be described in greater detail below with respect to FIG. 4, it is contemplated that at least some of the diversion routes (e.g., diversion routes 118-130) may have a channel-like shape to aide in the diversion of materials to the reservoir 112.

Figure 1B:
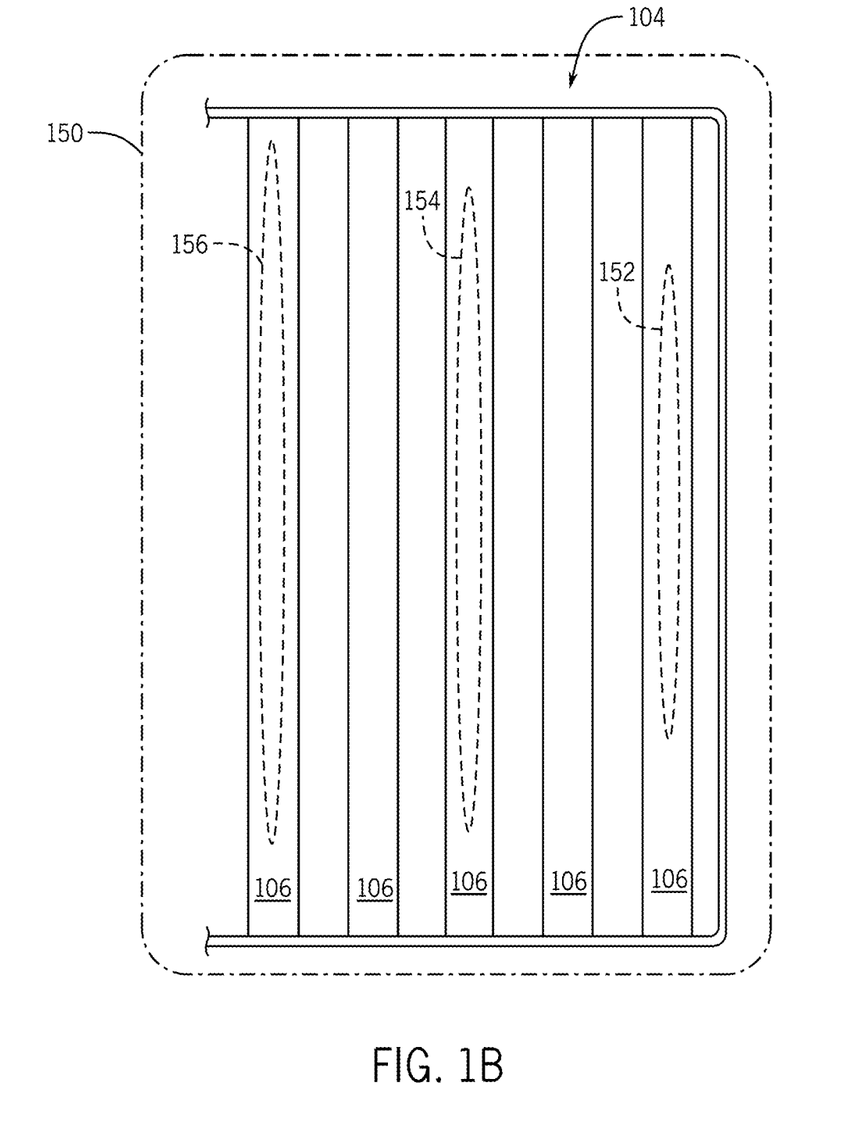
FIG. 1B illustrates a portion of the grate represented in FIG. 1A according to an embodiment.

With reference now to FIG. 1B, a top view of a portion 150 of the grate 104 of FIG. 1A is illustrated according to an embodiment. As illustrated, a first imaginary vertical projection 152, a second imaginary vertical projection 154, and a third imaginary vertical projection 156 are shown on separate support members 106. With reference now to both FIGS. 1A and 1B, the first vertical projection 152 represents the vertical projection of slot 148 onto support 106 when the grilling apparatus 100 is assembled. Similarly, the second vertical projection 154 represents the vertical projection of slot 146 onto support member 106 and the third vertical projection 156 represents the vertical projection of slot 144 onto support member 106. Since the support members 106 overlap the vertical projections 152-154 of the slots 144-148, it will be clear to an artisan that at least some of the support members overlap the slots 134-148 of the collection plate 102. In other words, when the grilling apparatus 100 is assembled, each slot or basin void 134-148 is positioned below respective support members 106. Accordingly, material that may fall between the support members 106 is more likely to fall onto a diversion route 116-132 rather than through one of the slots 134-148.

Figure 2:
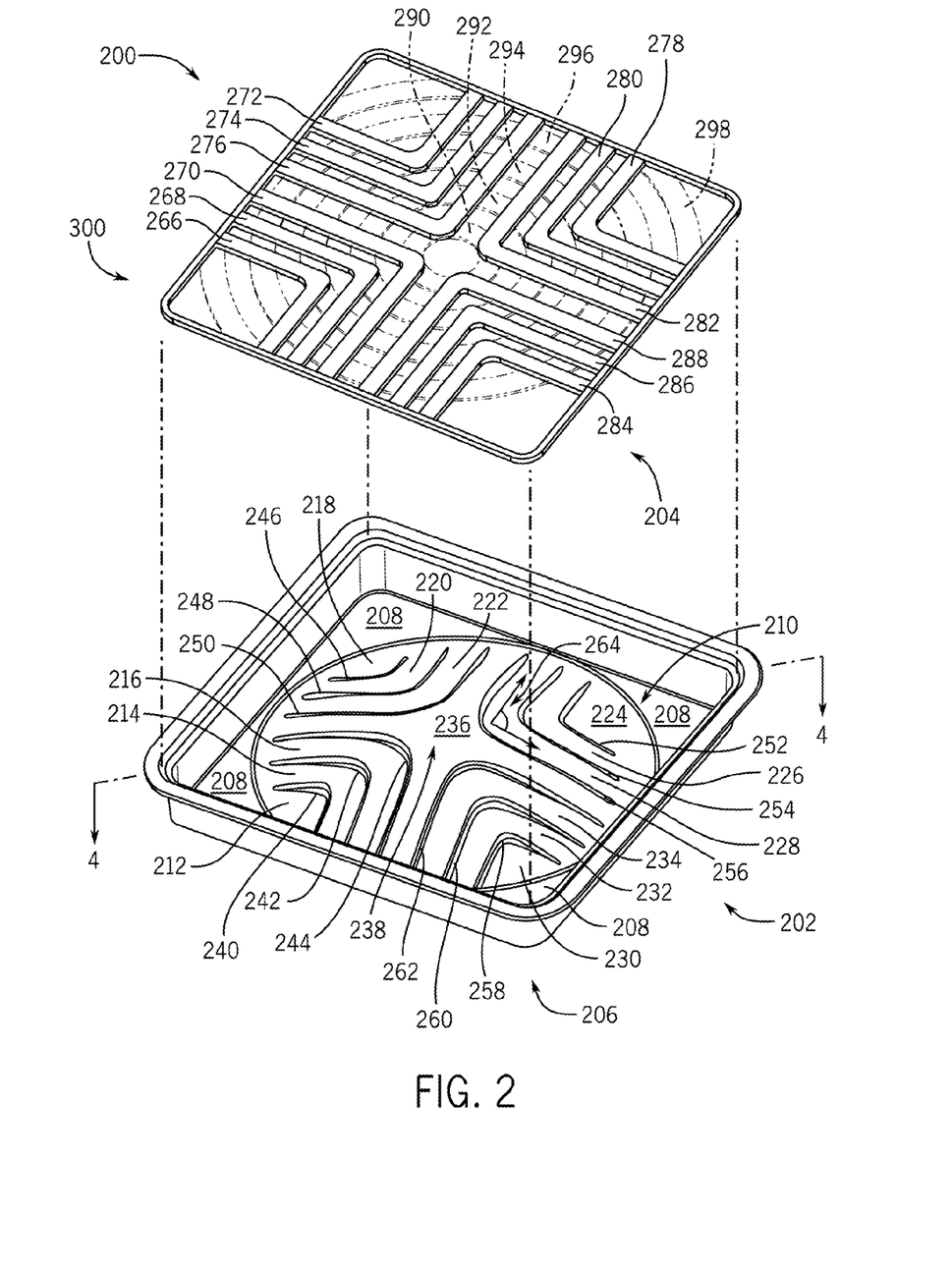
FIG. 2 illustrates an exploded view of exemplary grilling apparatus according to another embodiment.

With reference now to FIG. 2, components of a cooking or grilling apparatus 200 are illustrated according to an embodiment. The grilling apparatus 200 includes a collection basin or plate 202 and a grill or grate 204. Along a bottom surface 206 of the collection basin 202 is a reservoir 208 that is contiguous around the perimeter of the collection basin 202. It is noted that though the reservoir 208 around the perimeter of the collection basin 202 is contiguous, alternate embodiments may employ more than one reservoir that may not be contiguous around the perimeter.

The collection basin 202 also includes an arcuate or domed portion 210. The domed portion 210 of the collection plate includes a plurality of arcuate diversion routes 212, 214, 216, 218, 220, 222, 224, 226, 228, 230, 232, 234 along with a cross-like diversion route 236 that passes through an apex 238 of the domed portion 210. According to an embodiment, the apex 238 of the domed portion is substantially centered in the collection basin 202. Each of the diversion routes 212-236 generally follow contours of the domed portion 210 of the collection basin 202. Since the diversion routes 212-236 follow contours of the domed portion 210, they may be considered routes that trace out contours of the domed-portion 210. For example, diversion routes 212-234 trace out twelve contours of the domed portion 210. Between each set of adjacent diversion routes (e.g., diversion routes 212-214 and 234-236), is an arcuate void or slot 240, 242, 244, 246, 248, 250, 252, 254, 256, 258, 260, 262 that pass through the collection plate 202. Similar to the diversion routes 212-236, the slots 240-262 generally follow contours of the domed portion 210 of the collection basin 202. Since the slots 240-262 (i.e., contour voids) pass through the collection basin 202, flame or heat from a heat source may easily pass through the collection plate to food items (not shown) on the grate 204.

The arcuate diversion routes 212-234 are configured to convey liquids or other materials that fall thereon to the reservoir 208. As will be set forth in detail below with respect to FIG. 4, it is contemplated that at least some of the diversion routes 212-236 of FIG. 2 are configured as channels to aid in the flow of material to the reservoir 208.

It is noted that the number of arcuate diversion routes 212-234 and slots 240-262 illustrated in FIG. 2 are merely exemplary. That is, alternate embodiments are envisioned that employ more or less diversion routes and slots than those shown. Further, though the diversion routes 212-234 and slots 240-262 have an approximate 90 degree 264 angular form, other embodiments are contemplated in which the angular form is more obtuse, acute, or with additional curves.

The grate 204 of FIG. 2 includes a plurality of angular or arcuate support members 266, 268, 270, 272, 274, 276, 278, 280, 282, 284, 286, 288 configured to support food or other items (not shown) when the grate 204 is supported by the collection plate 202. These arcuate support members run along a horizontal plane 289 of the grate 204. Further, as will be set forth in detail with respect to FIGS. 3 and 4, the arcuate support members 266-288 of grate 204 illustrated in FIG. 2 are configured to approximately align with the slots 240-262 while the collection plate 202 is supporting the grate 104. Accordingly, the chances that liquids or other material falling between one or more of the arcuate support members 266-288 will pass through one or more of slots 240-262 is minimized. As such, the heat source (e.g., a cooktop burner) is at least partially protected from falling debris such as grease and flare-ups can be minimized.

According to an alternate embodiment, it is contemplated that the grate 204 includes further support structure. For example, as shown in phantom, the grate 204 may include structure that gives the appearance of a plurality of circles 290, 292, 294, 296, 298, with each circle having a different diameter. The additional support structure may add to the integrity of grate 204.

It is envisioned that other geometries may be employed for the structure of grate 204 other than or in addition to those shown. As an artisan will appreciate, each unique support member or structure (e.g., arcuate support members 266-288 and/or circular-like structure 290-298) of grate 204 may, in combination, provide a unique grill pattern on the food item being grilled.

Figure 3:
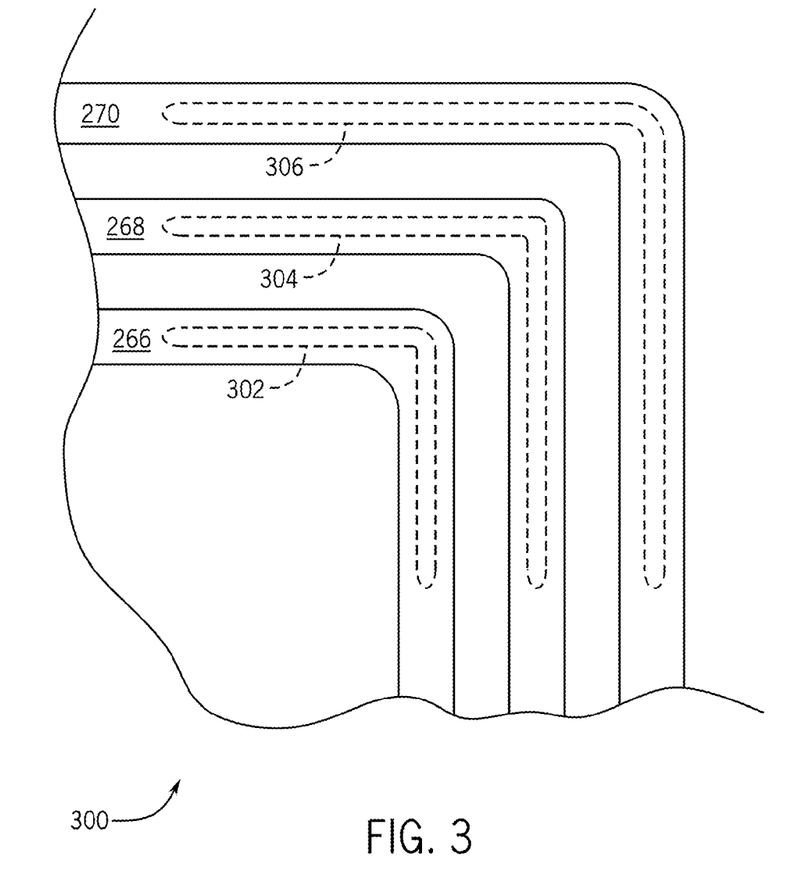
FIG. 3 illustrates a portion of the grate represented in FIG. 2 according to an embodiment.

With reference now to FIG. 3, a top view of a portion 300 of FIG. 2 is illustrated. Three support member 266, 268, 270 of FIG. 2 as well as three imaginary vertical projections 302, 304, 306 are shown in FIG. 3.

With reference to now to both FIGS. 2 and 3, the three projections 302-306 represent vertical projections of respective arcuate slots 240, 242, 244 onto the grate 204 when the grilling apparatus 200 is in use. The vertical projections 302-306 illustrate that the arcuate support members 266-270, respectively, are in alignment with the respective arcuate slots 240-244 when the grilling apparatus 200 is assembled. As such, when the grilling apparatus 200 is assembled, each arcuate slot (e.g., slots 240-244) is positioned below the support members (e.g., support members 266-270). Accordingly, when material such as grease falls between any of support members 266-288, the material is more likely to fall onto one of the diversion routes 212-236.

Figure 4:
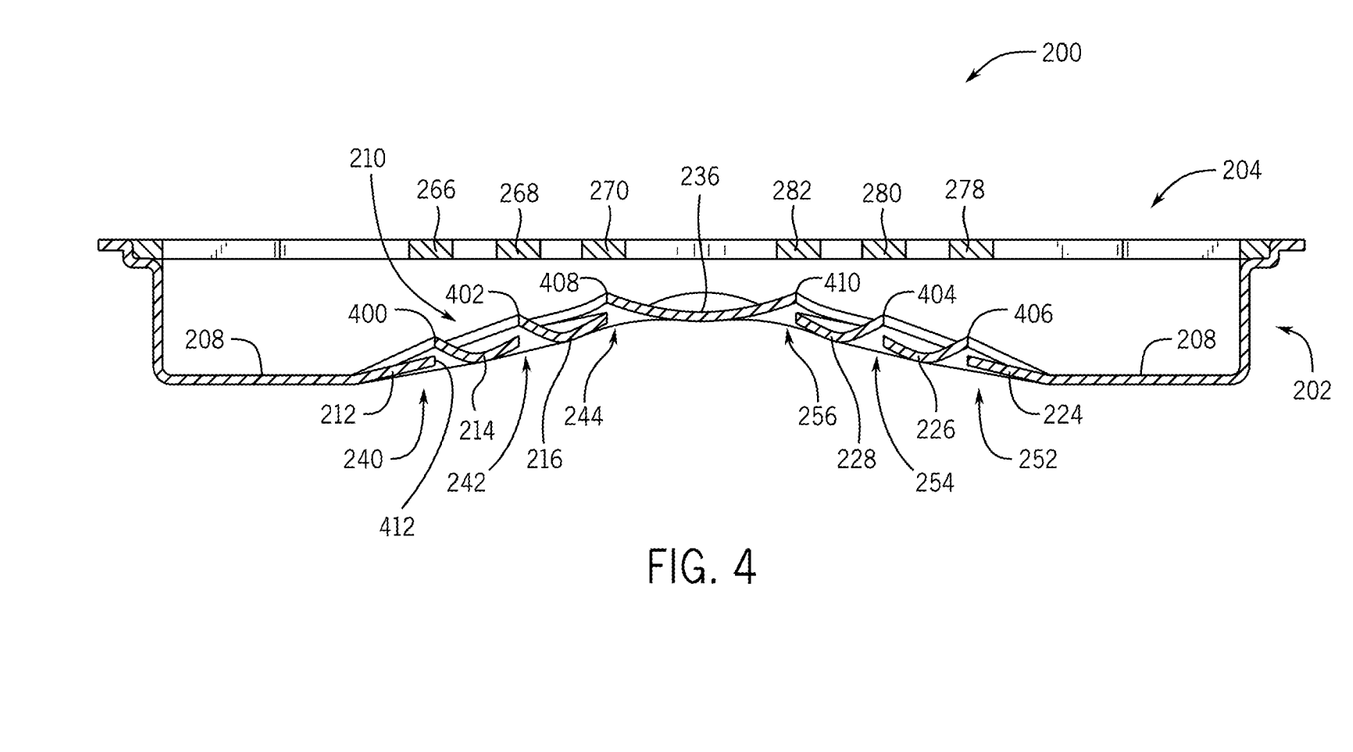
FIG. 4 illustrates a cross-sectional view of the grilling apparatus of FIG. 2 along 4-4 according to an embodiment.

With reference now to FIG. 4, a cross-sectional view the grilling apparatus 200 of FIG. 2 along 4-4 is illustrated. It will be appreciated that the grilling apparatus 200 illustrated in FIG. 4 is assembled. As illustrated, the collection plate 202 supports the grate 204 above the reservoir 208 and the plurality of diversion routes or channels 212-216, 224-228, 236 of the domed portion 210 of the collection plate 202. According to an embodiment, one or more diversion routes (e.g., diversion routes 214, 216, 226, 228, 236) may be formed into channels, thus creating diversion channels.

While supported by the collection plate 202, the arcuate support members 266-270, 278-282 of the grate 204 vertically align with the respective slots 240-244, 252-256 such that liquids or other materials (not shown) that fall past the grate 204 are likely to land on the diversion routes or channels (e.g., diversion channel or rotes 212-216, 224-228, 236). As such, materials that fall past the grate 204 are less likely to pass through the slots (e.g., collection basin voids 240-244, 252-256) and onto the heat source employed (e.g., cooktop or oven). It will be appreciated that this can minimize smoke and/or flames, while also minimizing the amount of material that should to be cleaned from the heat source (e.g., a cooktop or an oven rack or bottom).

It is contemplated that the diversion channels (see e.g., 212-216, 224-228, 236 of FIG. 4) may overlap or be imbricated. For example, the collection plate may be manufactured such that edges of the diversion routes overlap adjacent slots and/or adjacent diversion routes. That is, an edge 400, 402, 404, 406, of respective diversion channels 214, 216, 228, 226 and two edges 408, 410 of diversion channel 236 may be manufactured to overlap respective slots 240, 242, 254, 252, 244, 256. Accordingly, the likelihood that material that falls past the grate 204 will fall through one or more of the slots (e.g., slot 240-244, 252-256) is minimized. It is noted that the amount of overlap may be increased such that one edge of a channel overlaps an edge of an adjacent channel. For example, and edge 412 of diversion route 212 and/or the edge 400 of diversion route 214 may be manufactured such that the edge 400 of diversion route 214 overlaps (without touching) the edge 412 of diversion route 212. As such, material that may fall or drip from an edge (e.g., edge 400) of one diversion route (e.g., diversion route 214) may land on a lower positioned diversion route (e.g., diversion route 212). It will be appreciated that the overlapping edges described above are exemplary. That is, embodiments are envisioned where other, additional, or all edges of the diversion channels are overlapped.

It will be appreciated that imbrication of the diversion channels may be achieved in ways other than those described above.

Figure 5:
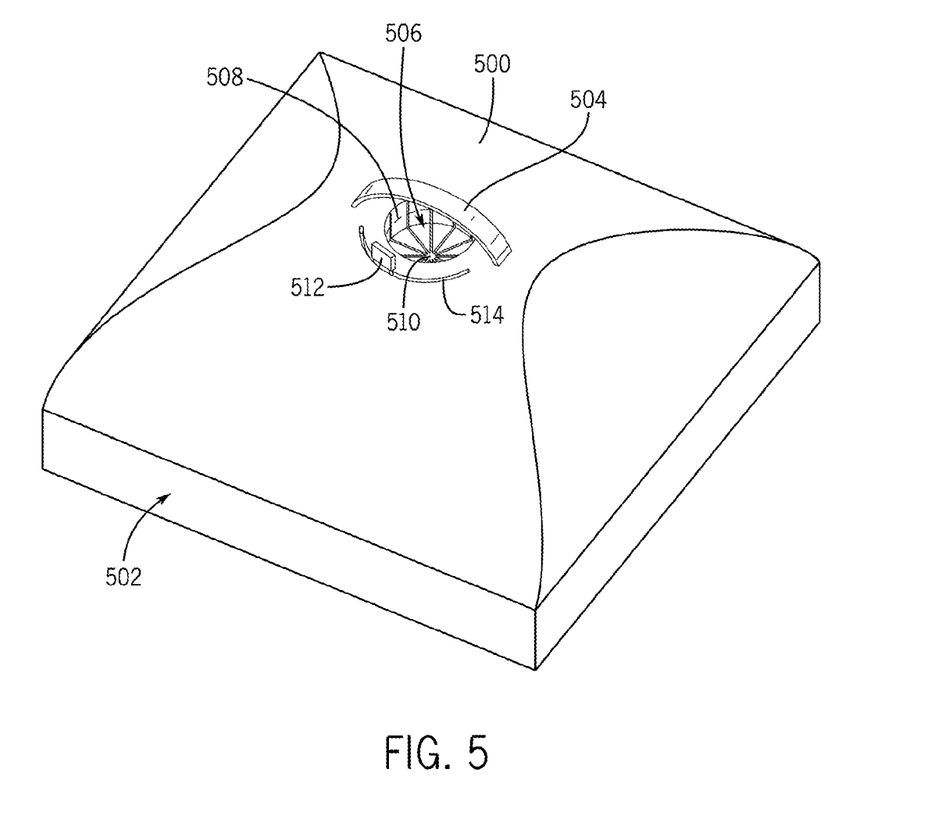
FIG. 5 illustrates a cover for a grilling apparatus according to an embodiment.

Referring now to FIG. 5, an exemplary cover 500 for a grilling apparatus 502 is illustrated according to an embodiment. Cover 500 includes a handle 504 and a seasoning reservoir 506 that is configured to hold liquid or dry seasonings (not shown). It is contemplated that the seasoning reservoir 506 may include one or more measurement marks 508 (shown in phantom) to aid in the measurement of seasonings added to the seasoning reservoir 506. The seasoning reservoir 506 also includes one or more voids such as hole 510 that pass through the cover 500. It is contemplated that the cover 500 may include a dispensing structure 512 that is configured to seal and unseal the reservoir 506. For example, rotating dispensing structure 512 may move through slot 514 to open or close the hole 510. Accordingly, liquid or dry seasonings (not shown) may be retained in the seasoning reservoir 506 and later dispensed through the one or more voids (e.g., hole 510) onto the grilling apparatus 502 during, for example, cooking. It will be appreciated that a variety of dispensing type structure(s) may be employed to seal and unseal the reservoir 506.

Further, it is contemplated that if a liquid seasoning is employed during operation of the grilling apparatus 502, heat conveyed to the grilling apparatus 502 from the heat source (not shown) may vaporize the liquid seasoning dispensed from the seasoning reservoir 506 through hole 510. As such, the vaporized seasoning may impart further flavor to the food items (not shown) being cooked.

Though not shown, additional reservoirs could be added or formed into the cover 500. It is noted that embodiments are envisioned where the quantity, shape, and placement of one or more seasoning reservoirs differ than that shown in FIG. 5. In addition to varying the shape of the reservoir 506, the shape of the cover 500 may also vary, while still retaining the ability to retain heat and/or moisture while the grilling apparatus 502 is in use.

The cover 500 may, for example, be comprised of a solid material such as metal or glass. Alternatively, the cover 500 may be comprised of a flexible heat resistant material (e.g., a cooking safe silicone material). An artisan will appreciate that the cover may also be comprised of a mixture of solid and flexible materials.

Figure 6:
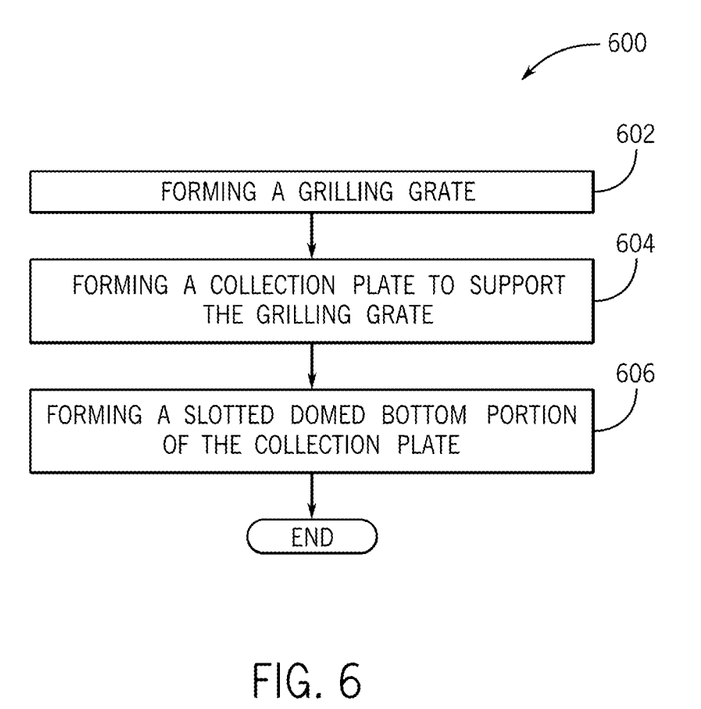
FIG. 6 is a flowchart representing an exemplary method of manufacturing a grilling apparatus according to an embodiment.

Referring now to FIG. 6, a flowchart illustrates a technique 600 or method for manufacturing a grilling apparatus according to an embodiment. Technique 600 begins at block 602, where a grate (e.g., grate 104 of FIG. 1 or grate 204 of FIG. 2) of a grilling apparatus (e.g., grilling apparatus 100 of FIG. 1 or grilling apparatus 200 of FIG. 2) is formed or created. It is contemplated that the grate may be manufactured as one piece or as a plurality of pieces that are later assembled. The grate may be comprised of one or more metals or other types of material suitable for grilling food items and may be coated with a food safe non-stick material. Further, the grate may be manufactured from a dishwasher-safe material such as, for example, cast iron, porcelain-coated cast iron, or stainless steel.

Once the grate is manufactured, process control of technique 600 of FIG. 6 proceeds to block 604, where a collection plate having a slotted domed bottom portion (e.g., collection plate 102 having domed portion 114 of FIG. 1) is formed or assembled. It is noted that while the collection plate is configured to support the grate, the domed portion of the bottom surface of the collection plate includes a plurality of diversion routes with slots (i.e., voids through the bottom surface) generally therebetween. The slots allow for heat from the heat source employed during operation to pass to the food item(s) supported by the grate. Further, since at least a portion of the bottom surface of the collection plate is dome shaped, the diversion routes that pass along the sloping sides of the dome shape aid in conveying grease or other materials that fall through the grate away from the heat source; thus minimizing flare-ups.

A stamping process may be employed to create the collection plate. For example, a stamping process may be employed to create the slots and/or domed portion of the bottom surface of the collection plate having the diversion routes. Further, the collection plate may be formed or stamped from a single piece of metal and then powdered coated with a heat resistant and/or non-stick material. Alternatively, however, the collection plate may be comprised of more than one pieces of material and preassembled prior to sale or sold as a "kit" to be assembled by a user.

It is noted that other methods of manufacture are envisioned. For example, one or more molding processes, sand casting processes, or other processes may be employed to manufacture the collection plate.

It is also noted that the manufacture of the collection plate at block 604 may occur before or during the manufacture of the grate at block 602.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, terms such as "first," "second," "third," and the like are employed to provide distinction and do necessarily imply a sequence or a quantitative limit.

What is claimed is:

1. A cooking apparatus comprising:
    a cooking grate configured to support food items;
    a collection plate configured to support the cooking grate during a cooking operation, wherein the collection plate is further configured to protect substances that fall past the cooking grate from a heat source flame, and wherein the collection plate comprises:
        a first, second, and third collection channel along a domed surface of the collection plate, the domed surface of the collection plate having an apex substantially centered in the collection plate, and wherein the first, second, and third collection channels respectively follow a first, second, and third contour of the domed bottom surface, and wherein (i) a portion of the first collection channel overlaps a portion of the second collection channel such that debris falling from the first collection channel lands on the second collection channel, and (ii) a portion of the second collection channel overlaps a portion of the third collection channel such that debris falling from the second collection channel falls onto the third collection channel;
        at least one reservoir configured to collect grease diverted by at least one of the first, second, and third collection channels;
        a first nonlinear collection plate void between the first and the second collection channel, wherein the first nonlinear collection plate void follows a fourth contour of the domed surface; and
        a second nonlinear collection plate void between the second and the third collection channel, wherein the second nonlinear collection plate void follows a fifth contour of the domed surface;
    and wherein the cooking grate comprises:
        a first support member along a horizontal plane of the cooking grate, wherein the first support member substantially overlaps a vertical projection of the first nonlinear collection plate void when the cooking apparatus is assembled; and
        a second support member along the horizontal plane of the cooking grate, wherein the second support member substantially overlaps a vertical projection of the second nonlinear collection plate void when the cooking apparatus is assembled.

2. The cooking apparatus of claim 1, wherein both the first and second support members are nonlinear.

3. The cooking apparatus of claim 2 further comprising a cooking grate cover configured to substantially cover the cooking grate, wherein the cooking grate cover comprises:
    a seasoning reservoir configured to dispense seasoning placed therein; and
    a measurement indication configured to indicate a volume of seasoning retained in the seasoning reservoir.

* * * * *